(12) United States Patent
Desie et al.

(10) Patent No.: US 7,278,728 B2
(45) Date of Patent: Oct. 9, 2007

(54) INK-JET PRINTING SYSTEM

(75) Inventors: Guido Desie, Herent (BE); Dirk Quintens, Westerlo (BE); Bavo Muys, Eppegem (BE); Patrick Mertens, Vrasene (BE); Rene De Keyzer, Waasmunster (BE); Roland Claes, Dendermonde (BE)

(73) Assignee: Agfa Graphics NV, Mortsel (BE)

( * ) Notice: Subject to any disclaimer, the term of this patent is extended or adjusted under 35 U.S.C. 154(b) by 318 days.

(21) Appl. No.: 11/041,854

(22) Filed: Jan. 24, 2005

(65) Prior Publication Data

US 2005/0190245 A1    Sep. 1, 2005

Related U.S. Application Data

(60) Provisional application No. 60/551,952, filed on Mar. 10, 2004.

(30) Foreign Application Priority Data

Feb. 20, 2004   (EP)   ................... 04100684

(51) Int. Cl.
  *G01D 11/00* (2006.01)
(52) U.S. Cl. ...................... 347/100; 347/105
(58) Field of Classification Search .............. 347/100, 347/95, 96, 101, 102, 105; 428/195, 32.1; 106/31.6, 31.27, 31.13; 523/160
See application file for complete search history.

(56) References Cited

U.S. PATENT DOCUMENTS

| | | | |
|---|---|---|---|
| 3,705,043 A | 12/1972 | Zabiak | |
| 3,739,393 A | 6/1973 | Lyon et al. | |
| 3,776,742 A | 12/1973 | Sanders | |
| 3,805,273 A | 4/1974 | Brady et al. | |
| 3,846,141 A | 11/1974 | Ostergren et al. | |
| 3,870,528 A | 3/1975 | Edds et al. | |
| 3,889,269 A | 6/1975 | Meyer et al. | |
| 3,891,121 A | 6/1975 | Stoneburner | |
| 3,903,034 A | 9/1975 | Zabiak et al. | |
| 4,303,924 A | 12/1981 | Young, Jr. | |
| 6,467,898 B2 * | 10/2002 | Codos et al. | ............... 347/102 |

FOREIGN PATENT DOCUMENTS

| | | |
|---|---|---|
| EP | 1 199 181 A2 | 4/2002 |
| JP | 2003-261799 | 9/2003 |
| WO | WO 03/074619 A1 | 9/2003 |

* cited by examiner

*Primary Examiner*—Manish S. Shah
(74) *Attorney, Agent, or Firm*—Leydig Voit & Mayer, Ltd.

(57) ABSTRACT

An ink-jet printing system including at least one ink-jet ink and a means for jetting an ink-jet ink onto a surface of a substantially non-absorbing ink-jet ink-receiver, characterized in that the ratio $\sigma S^d / \sigma L^d$ of the dispersive surface energy of said ink-receiver surface $\sigma S^d$ over the dispersive surface energy of said ink-jet ink $\sigma L^d$ is greater than 0.9. A process for ink-jet printing is also claimed. High areal throughput ink-jet printing (e.g. >100 m²/hour) with curable inks can be performed on different kinds of ink-receiver surfaces with a good image quality and colour density due to a controlled spreading of the ink-drops which can be directly cured.

20 Claims, 1 Drawing Sheet

INK-JET PRINTING SYSTEM

CROSS-REFERENCE TO RELATED PATENT APPLICATIONS

This application claims the benefit of U.S. Provisional Application No. 60/551,952 filed Mar. 10, 2004, which is incorporated by reference. In addition, this application claims the benefit of European Application No. 04100684 filed Feb. 20, 2004, which is also incorporated by reference.

TECHNICAL FIELD

The present invention relates to high-speed ink-jet printing.

BACKGROUND ART

In ink-jet printing, tiny drops of ink fluid are projected directly onto an ink receptor surface without physical contact between the printing device and the receptor. The printing device stores the printing data electronically and controls a mechanism for ejecting the drops image-wise. Printing is accomplished by moving a print head across the paper or vice versa. Early patents on ink-jet printers include U.S. Pat. No. 3,739,393 (MEAD CORP), U.S. Pat. No. 3,805,273 (MEAD CORP) and U.S. Pat. No. 3,891,121 (MEAD CORP)

Ink compositions for ink-jet typically include following ingredients: dyes or pigments, water and/or organic solvents, humectants such as glycols, detergents, thickeners, polymeric binders, preservatives, etc. It will be readily understood that the optimal composition of such ink is dependent on the ink-jetting method used and on the nature of the ink-receiver to be printed. The ink compositions can be roughly divided in:

water-based, the drying mechanism involving absorption, penetration and evaporation;
oil-based, the drying involving absorption and penetration;
solvent-based, the drying primarily involving evaporation;
hot melt or phase change, in which the ink is liquid at the ejection temperature but solid at room temperature and wherein drying is replaced by solidification;
UV-curable, in which drying is replaced by polymerization.

It will be readily understood that the first two types of ink compositions are more suitable for a receiving medium that is more or less absorptive, whereas hot melt inks and UV-curable inks are more suitable for non-absorbent ink-receivers.

Early patents on water-based inks include U.S. Pat. No. 3,903,034 (AB DICK CO), U.S. Pat. No. 3,889,269 (AGFA GEVAERT), U.S. Pat. No. 3,870,528 (IBM), U.S. Pat. No. 3,846,141 (AB DICK CO), U.S. Pat. No. 3,776,742 (MEAD CORP) and U.S. Pat. No. 3,705,043 (AB DICK CO). However, systems based on water-based inks suffer from a number of disadvantages such as: (a) their requiring water evaporation and therefore an extensive drying system, especially when printing speed is important; (b) the tendency of large printed areas to cockle, (c) sensitivity of images to wet and dry rubbing, (d) the tendency of low viscosity inks to dry at the tip of the orifice which can be avoided by the use of humectants, usually glycols, which increase the viscosity. The use of polar solvent-based inks can overcome some of the problems inherent in water-based inks, but results in other problems such as the possible generation of toxic or inflammable vapours. Therefore efforts were made to develop low-solvent ink compositions from which the concept of UV-curable ink compositions emerged.

U.S. Pat. No. 4,303,924 (MEAD CORP) discloses an ink-jet printing process using charged droplets wherein the ink composition contains (a) a multifunctional unsaturated UV-curable compound, (b) a monofunctional unsaturated compound, (c) a reactive synergist, (d) a colorant, (e) an oil soluble salt for conductivity, (f) a photo-initiator, and (g) an organic polar solvent, preferably in a small amount.

However the behaviour and interaction of a UV-curable ink on a substantially non-absorbing ink-receiver was found to be quite complicated compared to a water- or a solvent-based ink on absorbent ink-receivers. In particular, a good and controlled spreading of the ink on the substrate is problematic.

EP 1199181 A (TOYO INK MANUFACTURING CO.) discloses a method for ink-jet printing on a surface of a substrate of a synthetic resin, said method comprising the steps of:

1. conducting a surface treatment to said surface so as to provide the surface with a specific surface free energy of 65-72 $mJ/m^2$
2. providing an activation energy beam curable ink having a surface tension of 25-40 mN/m
3. discharging the ink onto the surface having the specific surface free energy with an ink-jet printing device thereby forming printed portions of said ink on the surface and
4. projecting an activation energy beam onto the printed portions.

Surface tension and surface energy are equivalent parameters. The surface tension of a liquid is defined as the force acting on a unit length of the surface and is expressed in mN/m, whereas surface energy of a solid is the energy needed to create a unit area of interface and is expressed in $mJ/m^2$. These dimensions are equivalent: $mN/m \times m/m = mJ/m^2$. For consistency in disclosing the present invention, the term surface energy of an ink will be used instead of the term surface tension of an ink. Hence, in step 2 of the method disclosed by EP 1199181 A (TOYO INK MANUFACTURING CO.) the surface tension of 25-40 mN/m is equivalent to a surface energy of 25-40 $mJ/m^2$.

The method of EP 1199181 A (TOYO INK MANUFACTURING CO.) further appears to teach that the surface energy of the ink-receiver surface should be greater than the surface energy of the ink. Yet in the examples, although the surface energy of the four untreated synthetic resin substrates (ABS, PBT, PE and PS) was higher than the surface energy of the four different inks, a good 'quality of image' i.e. good spreading of the ink was not observed. EP 1199181 A (TOYO INK MANUFACTURING CO.) is also silent about the dispersive and polar components of surface energy of the ink and the substrate. The surface treatments used in the examples were corona treatment and plasma treatments.

JP 2003261799 (KONICA) discloses a method for jetting inks containing radical polymerization initiators, polymerizable monomers, and surface active agents onto preferably non-absorbing recording media and irradiating them with UV-light. An oriented polypropylene (OPP) sheet with a surface energy of 38 dyne/cm was printed using a set of black, yellow, magenta and cyan inks, having surface tensions from 24 to 30 mN/m, and containing 24 wt % of Kyarad™ DPCA (hexaacrylate), 23 wt % of Biscoat™ 335HP (tetraethylene glycol diacrylate), 41 wt % of light acrylate PO-A™ (phenoxyethyl acrylate), 5 wt % of Irgacure™ 369 (initiator) and 3 wt % of a vinyl monomer-type surface active agent.

WO 03074619 A (DOTRIX NV—SERICOL LTD) discloses a progressive dot printing ink-jet process comprising the steps of applying a first ink drop to a substrate and subsequently applying a second ink drop on to the first ink drop without intermediate solidification of the first ink drop, wherein the first and second ink drops have a different viscosity, surface tension or curing speed. It also claims a set of ink-jet inks suitable for use in a progressive dot printing ink-jet process comprising at least two inks having a different viscosity, surface tension or curing speed.

In the examples WO 03074619 A (DOTRIX NV—SERICOL LTD) discloses the use of a high-speed printer for printing UV-curable inks on a PVC substrate. This was performed in a 'wet-on-wet printing' process, wherein the first/subsequent ink drops are not cured, i.e. they are not irradiated prior to application of the next ink drop. In this way an increase in the ink spreading can be realized due to the increased volume of ink of the combined ink drops on the substrate. The WO 03074619 A (DOTRIX NV—SERICOL LTD) is also silent about the dispersive and polar components of surface energy of the ink and the substrate.

There is therefore a need to provide an ink-jet printing system suitable for high areal throughput printing (i.e. high area of ink-receiver printed per unit time, e.g. >100 m²/hour) with curable inks, which enables different types of ink-receivers to be used.

OBJECTS OF THE INVENTION

It is an object of the present invention to provide an ink-jet printing system suitable for high areal throughput ink-jet printing i.e. high area of ink-receiver printed per unit time.

It is another object of the present invention to provide an ink-jet printing system with an ink-jet ink having a spreading factor greater than 2.0 and a high optical density when jetted on the surface of a substantially non-absorbing ink-jet ink-receiver.

It is a further object of the present invention to provide a process for high areal throughput ink-jet printing using an ink-jet ink having a spreading factor greater than 2.0 and a high optical density when jetted on the surface of a substantially non-absorbing ink-jet ink-receiver.

These and other objects of the invention will become apparent from the description hereinafter.

SUMMARY OF THE INVENTION

It has been surprisingly found that an ink-jet printing system comprising a means for jetting an ink-jet ink having a dispersive surface energy $\sigma_L^d$ onto a surface of a substantially non-absorbing ink-receiver having a dispersive surface energy $\sigma_S^d$ can realize a beneficial spreading and a high colour density if the ratio $\sigma_S^d/\sigma_L^d$ is greater than 0.9.

The objects of the present invention are realized with an ink-jet printing system comprising at least one ink-jet ink having a dispersive surface energy $\sigma_L^d$ and a means for jetting said ink-jet ink onto a surface of a substantially non-absorbing ink-jet ink-receiver having a dispersive surface energy $\sigma_S^d$, characterized in that the ratio $\sigma_S^d/\sigma_L^d$ is greater than 0.9.

The objects of the present invention are also realized with a process for ink-jet printing, comprising the steps of:

(1) jetting at least one ink-jet ink having a dispersive surface energy $\sigma_L^d$ onto a surface of a substantially non-absorbing ink-jet ink-receiver having a dispersive surface energy $\sigma_S^d$, and (2) curing said ink-jet ink,
characterized in that the ratio $\sigma_S^d/\sigma_L^d$ is greater than 0.9.

DETAILED DESCRIPTION OF THE INVENTION

Definitions

Figure 1:
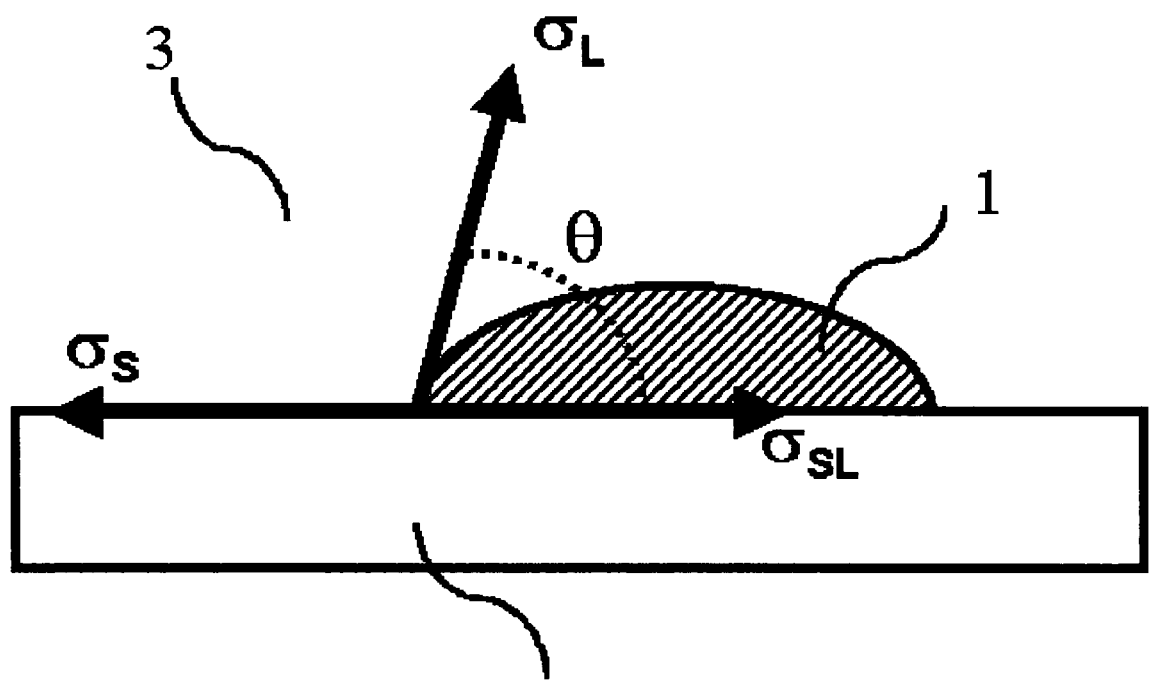
FIG. 1 is a schematic representation defining the relation between the contact angle and the surface energy.

The surface energy of the ink-jet ink receiving surface of the ink-receiver, as used in disclosing the present invention, is represented by the symbol $\sigma_S \cdot \sigma_S$ is composed of a dispersive component, represented by the symbol $\sigma_S^d$, and a polar component, represented by the symbol $\sigma_S^P$, as defined by the Owens-Wendt equation.

The surface energy of the liquid ink-jet ink, as used in disclosing the present invention, is represented by the symbol $\sigma_L \cdot \sigma_L$ is composed of a dispersive component, represented by the symbol $\sigma_L^d$ and a polar component, represented by the symbol $\sigma_L^P \cdot \sigma_L^d$ is either determined from the shape of a pendant drop in hexane, if insoluble in hexane, using Equation 3. If the ink-jet ink is soluble in hexane the dispersive surface energy $\sigma_L^d$ as defined by Fowkes in Equation 4 for an apolar liquid and in Equation 5 for a polar liquid is determined using the Owens-Wendt method. A polar liquid is here defined as a liquid with $(\sigma_L - \sigma_L^d)$ larger than 0.2, whereby $\sigma_L^d$ was obtained with Equation 4.

The term "dispersive component of the surface energy" has been abbreviated in the present application to "dispersive surface energy".

The term "polar component of the surface energy" has been abbreviated in the present application to "polar surface energy".

The term "colorant", as used in the present invention, means dyes and pigments.

The term "dye", as used in the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the application medium under the pertaining ambient conditions, hence having a solubility of less than 10 mg/L therein.

The term "filler", as used in the present invention, means an inorganic or organic material added to an ink-receiver to modify its properties, e.g. adhesion of a subbing layer to a polyester film, opacity of an ink-receiver and tribo-electrical properties.

The term "monofunctional" means one reactive functional group.

The term "polyfunctional" means more than one reactive functional group.

The term "substantially non-absorbing ink-jet ink-receiver" means any ink-jet ink-receiver which fulfils at least one of the following two criteria:

1) No penetration of ink into the ink-jet ink-receiver deeper than 2 μm;

2) No more than 20% of a droplet of 100 pL jetted onto the surface of the ink-jet ink-receiver disappears into the ink-jet ink-receiver in 5 seconds. If one or more coated layers are present, the dry thickness should be less than 5 μm. Standard analytical method can be used by one skilled in the art to determine whether an ink-receiver falls under either or both of the above criteria of a substantially non-absorbing ink-receiver. For example, after jetting ink on the ink-receiver surface, a slice of the ink-receiver can be taken and examined by transmission electron microscopy to determine if the penetration depth of the ink is greater than 2 μm. Further information regarding suitable analytical methods can be found in the article: DESIE, G, et al. Influence of Substrate Properties in Drop on Demand Printing. *Proceedings of Imaging Science and Technology's* 18*th International Conference on Non Impact Printing.* 2002, p. 360-365.

The term "dpi" is an abbreviation of the term dots per inch, i.e. the number of dots made by inkjet-ink droplets per 2.54 cm.

Surface Energy

Surface tension and the surface energy represent the same physical quantity.

In FIG. 1, in an environment consisting of vapour 3, a drop of a liquid 1 resting on the surface of a solid 2 forming an angle θ, may be considered as resting in equilibrium by balancing the three energies involved. Namely, the interfacial energy between solid and liquid $\sigma_{SL}$, the interfacial energy between solid and vapour (i.e. the surface energy of the solid $\sigma_S$) and the interfacial energy between liquid and vapour (i.e. the surface energy of the liquid $\sigma_L$). The angle θ the liquid phase makes with the surface is known as the contact angle or wetting angle. As illustrated by FIG. 1, it is the angle included between the tangent plane to the surface of the liquid and the tangent plane to the surface of the solid, at any point along their line of contact. The surface energy of the solid $\sigma_S$ will favour spreading of the liquid, but this is opposed by the solid-liquid interfacial energy $\sigma_{SL}$ and the vector of the surface energy of the liquid $\sigma_L$ in the plane of the solid surface. The contact angle θ is defined by the Equation 1.

$$\cos \theta = (\sigma_S - \sigma_{SL})/\sigma_L \quad \text{(Equation 1)}$$

There is no direct way of measuring the surface energy of a solid $\sigma_S$ directly, it can however be obtained indirectly from experimentally determined equilibrium static contact angles.

The Owens-Wendt equation is used for calculating the surface energy of a solid $\sigma_S$ and it's polar ($\sigma_S^p$) and dispersive ($\sigma_S^d$) contribution on low energetic surfaces such as polymer surfaces. For high energetic surfaces such as metal or metal oxides other measurement and calculation methods, based on interfacial contact angles with two immiscible liquids, have to be used (Modern Approaches to Wettability: Theory and Applications. Edited by SCHRADER, Malcolm E., et al. New York: Plenum Press, 1992. ISBN 0306439859.). The surface energy can only be obtained if there is no chemical interaction between the solid and the liquid:

no dissolution of the solid in the liquid
no swelling of the solid
no extraction of components e.g. surfactants
no chemical reaction
instability of methylene iodide on alkaline surfaces
. . . etc.

The Owens-Wendt equation can be used to obtain the polar and dispersive surface energy components of a solid surface by contact angle measurements of a series of reference liquids, with known polar and dispersive surface energy components, on that solid surface, the so-called Owens-Wendt method (OWENS, Daniel K., et al. Estimation of the surface free energy of polymers. *Journal of Applied Polymer Science.* 1969, vol. 13, no. 8, p. 1741-1747.). Frequently used reference liquids are water, glycerol, ethyleneglycol, formamide, dimethysulfoxide, benzylalcohol, tricresyl phosphate and aniline. The calculation of the surface energy of the solid is based on a linear regression using Equation 2.

$$\sigma_L(1+\cos\theta)/2(\sigma_L^d)^{1/2} = (\sigma_S^d)^{1/2} + (\sigma_L^p/\sigma_L^d)^{1/2} \cdot (\sigma_S^p)^{1/2} \quad \text{(Equation 2)}$$

The properties of the reference liquids are known from the literature. However, the values used in the calculation of the $\sigma_S^d$ and $\sigma_S^p$ were obtained experimentally from surface energy measurements ($\sigma_L$) combined with either interfacial energy measurements versus hexane ($\sigma_L^d$) in the absence of solution in hexane or via the contact angle on a pure apolar surface like PTFE (Teflon). The values in Table 1 for the surface energy and dispersive surface energy of the liquids used in our linear regression calculations are consistent with those found in for example, VAN KREVELEN, D. W., et al. Properties of Polymers. 2nd edition. Amsterdam: Elsevier Scientific Publishing Company, 1976. p. 169.

TABLE 1

| Liquid | $\sigma_L$ (mJ/m$^2$) | $\sigma_L^d$ (mJ/m$^2$) |
|---|---|---|
| water | 72.8 | 21.8 |
| glycerol | 64.1 | 34.0 |
| ethylene glycol | 48.0 | 29.0 |
| formamide | 58.0 | 39.0 |
| dimethylsulphoxide | 44.0 | 36.0 |
| tricresyl phosphate | 40.9 | 39.2 |
| 1-bromo naphthalene | 44.4 | 43.5 |
| methylene iodide | 50.8 | 50.4 |
| benzylalcohol | 40.3 | 35.8 |
| hexadecane | 27.6 | 27.6 |

For the contact angle θ of Equation 2, the mean value of the maximum advancing and the minimum receding static angle was used. This eliminated any influence of surface roughness on the ink-receiver surface. The surface energy of the solid $\sigma_S$ then calculated by adding together the $\sigma_S^d$ and $\sigma_S^p$ values obtained from the linear regression.

The surface energy of a liquid $\sigma_L$ can be measured by the pendant drop technique. This method only requires a small amount of liquid and can be used for droplets of UV curable ink compositions. A calibrated video image of the drop gives a drop contour. The drop contour was then compared to theoretical drop shapes calculated from the Young-Laplace equation or certain critical dimensions are compared to Bashford-Adams tables (=numerical solution of the Young-Laplace equation). The method requires a knowledge of the difference in density between the two fluid phases compared.

For a liquid showing no solubility in hexane (i.e. less than 0.1% of weight), the pendant drop technique was used to determine both the surface energy $\sigma_L$ (measurement in air) and the dispersive energy $\sigma_L^d$, which is equal to interfacial energy $\sigma_{L1,L2}$ versus an immiscible apolar liquid (hexane), directly from the shape of a large pendant drop influenced by gravity. This was then used to determine, knowing the $\sigma_L^d$ value for hexane, the $\sigma_L^d$ value for the ink-jet ink by using the following equation:

$$\sigma_{L1,L2} = \sigma_{L1} + \sigma_{L2} - 2\sqrt{\sigma_{L1}^d \cdot \sigma_{L2}^d} \qquad \text{(Equation 3)}$$

where $\sigma_{L1}^d$ and $\sigma_{L2}^d$ are the dispersive force contributions to the surface tensions $\sigma_{L1}$ and $\sigma_{L2}$ of liquids L1 and L2, as described in FOWKES, F. M. Advances in Chemistry Series 43: Contact Angle, Wettability and Adhesion. Edited by GOULD, R. F. Washington D.C.: American Chemical Society, 1964. p. 99-111.

As already mentioned, for liquids showing solubility in hexane the dispersive component of the surface energy $\sigma_L^d$ was indirectly obtained from the contact angle on PTFE (Teflon), the dispersive surface energy $\sigma_S^d$ of PTFE being determined with the method of Owens-Wendt described above. For apolar liquids on an apolar substrate, $\sigma_L^d$ was obtained using the Fowkes equation (Equation 4):

$$\sigma_L^d = \frac{4 \cdot \sigma_S^d}{(1+\cos\theta)^2} \qquad \text{(Equation 4)}$$

For polar liquids on an apolar substrate, $\sigma_L^d$ was obtained using a different Fowkes equation (Equation 5):

$$\sigma_L \cdot (1 + \cos\theta) = 2 \cdot \sqrt{\sigma_S^d \cdot \sigma_L^d} \qquad \text{(Equation 5)}$$

If for a liquid, i.e. an inkjet ink, the difference between the surface energy of the liquid $\sigma_L$ and the dispersive surface energy of the liquid $\sigma_L^d$ obtained with Equation 4 was larger than 0.2 mJ/m$^2$, the liquid was considered to be a polar liquid and Equation 5 was used for calculating $\sigma_L^d$, otherwise Equation 4 was used. The Equations 4 and 5 can be found as equations 20c respectively 20a on page 8 in Modern Approaches to Wettability: Theory and Applications. Edited by SCHRADER, Malcolm E., et al. New York: Plenum Press, 1992. ISBN 0306439859.

For the ink-jet printing system according to the present invention a ratio $\sigma_S^d/\sigma_L^d$ of the dispersive surface energy of an ink-receiver surface $\sigma_S^d$ over the dispersive surface energy of an ink-jet ink $\sigma_L^d$ should be greater than 0.9. An upper limit of this ratio is 10, since the dispersive surface energy of an ink-receiver surface $\sigma_S^d$ is lower than 50 mJ/m$^2$ (e.g. $\sigma_S^d$ of polystyrene is 41.4 mJ/m$^2$, $\sigma_S^d$ of poly(vinylidene chloride) is 42.0 mJ/m$^2$) and the dispersive surface energy of an ink-jet ink $\sigma_L^d$ can be as low as 5 mJ/m$^2$.

Means for Jetting

In an ink-jet printing system according to the present invention, the means for jetting may be one or more printing heads ejecting small droplets of ink in a controlled manner through nozzles onto an ink-receiver surface, which is moving relative to the printing head(s). The ejected or jetted ink forms an image on the ink-receiver surface. At high printing speeds, the inks must be ejected readily from the printing heads, which puts a number of constraints on the physical properties of the ink, e.g. a low viscosity at the jetting temperature, which may vary from 25 to 110° C., a surface energy such that the printing head nozzle can form the necessary small droplets, a homogenous liquid capable of rapid conversion to a dry printed area, . . .

A preferred printing head for the ink-jet printing system according to the present invention is a piezoelectric head. Piezoelectric ink-jet printing is based on the movement of a piezoelectric ceramic transducer when a voltage is applied thereto. The application of a voltage changes the shape of the piezoelectric ceramic transducer in the printing head creating a void, which is then filled with ink. When the voltage is again removed, the ceramic expands to its original shape, ejecting a drop of ink from the print head.

The ink-jet printing system of this invention is however not restricted to piezoelectric ink-jet printing. Other ink-jet printing heads for ink ejection can be used and include various types, such as a continuous type and thermal, electrostatic and acoustic drop on demand type.

For printing, an ink-jet printing head normally scans back and forth in a transversal direction across the moving ink-receiver surface. Often the ink-jet print head does not print on the way back. Bi-directional printing is preferred for obtaining a high areal throughput. Particularly preferred, is printing in a "single pass printing process", which can be performed by using page wide ink-jet printing heads (e.g. a page wide printing head available from XAAR) or multiple staggered ink-jet printing heads which cover the entire width of the ink-receiver surface. In a single pass printing process the ink-jet printing heads usually remain stationary and the ink-receiver surface is transported under the ink-jet printing heads.

High areal throughput ink-jet printing according to this invention means that images should be printed at more than 50 m$^2$/hour, preferably at more than 100 m$^2$/hour, even more preferably at more than 200 m$^2$/hour and most preferably at more than 300 m$^2$/hour. The resolution should at least be 180 dpi, preferably at least 300 dpi. The ink-receiver used in the high areal throughput ink-jet printing system according to this invention has preferably a width of at least 240 mm, then requiring a printing speed of at least 35 m/min. More preferably the width of the ink-receiver is at least 300 mm, and particularly preferably the width of the ink-receiver is at least 500 mm.

Curing Means

In a preferred embodiment of the ink-jet printing process according to the present invention, a curable ink is jetted upon an ink-receiver surface, creating an uncured printed image. Subsequently, this printed image is cured by exposing it to radiation or by electron beam curing. A preferred means of radiation curing is ultraviolet light.

The curing means may be arranged in combination with the print head of the ink-jet printer, travelling therewith so that images printed upon the surface of the ink-receiver are exposed to curing radiation very shortly after having been printed upon the ink-receiver. In such an arrangement it can be difficult to provide a small enough radiation source connected to and travelling with the print head. Therefore, a static fixed radiation source may be employed, e.g. a source of curing UV radiation, connected to the radiation source by means of flexible radiation conductive means such as a fibre optic bundle or an internally reflective flexible tube.

Alternatively, the curing radiation may be supplied from a fixed source to the radiation head by an arrangement of mirrors including a mirror upon the radiation head.

The source of radiation arranged not to move with the print head, may also be an elongate radiation source extending transversely across the ink-receiver surface to be cured and adjacent the transverse path of the print head so that the subsequent rows of images formed by the print head are passed, stepwise or continually, beneath that radiation source.

In practical arrangement, it may be desirable to provide a plurality of print heads in relative close proximity in a printing station, for printing with different coloured inks to produce a multi-coloured image. In that case, each has its own dedicated radiation source.

Any ultraviolet light source may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

a UV-A: 400 nm to 320 nm
UV-B: 320 nm to 290 nm
UV-C: 290 nm to 100 nm.

Furthermore, it is possible to cure the printed image using two light sources of differing wavelength or illuminance. For example, the first UV source can be selected to be rich in UV-C, in particular in the range of 240 nm-200 nm. The second UV source can then be rich in UV-A, e.g. a gallium-doped lamp, or a different lamp high in both UV-A and UV-B. The use of two UV sources has been found to have advantages e.g. a fast curing speed.

It is known that differently coloured inks absorb UV radiation differently, i.e. they each absorb differently in each of the UV-A, UV-B and UV-C range. Having two curing lamps ensures complete curing of all the colours in a single pass. For example, some ink-jet inks absorb UV-C, so that deep parts of the ink layers may not be cured with the first UV source. The first UV-C-rich source completes the curing of the parts of the ink layers close to the surface. The second UV source in such a case cures the deeper parts of the ink layers. Thus all inks, even "difficult" colours such as black and thick inks, may be cured in a single pass.

For facilitating curing, the ink-jet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Ink-Receiver

The ink-receivers used in the ink-jet printing system of the present invention are substantially non-absorbing. For example, standard paper is not a suitable ink-receiver for use in this invention. On the other hand, a resin-coated paper may be suitable if it is substantially non-absorbing for the ink, e.g. polyethylene-coated paper and polypropylene-coated paper.

The ink-receiver for use in the ink-jet printing system of the present invention can be transparent, translucent or opaque.

Suitable ink-receivers for the ink-jet printing system of the present invention are polymeric substrates, for example, cellulose acetate propionate, cellulose acetate butyrate, polyesters such as polyethylene terephthalate (PET) and polyethylene naphthalate (PEN); oriented polystyrene (OPS); oriented nylon (ONy); polypropylene (PP); oriented polypropylene (OPP); polyvinyl chloride (PVC); and various polyamides, polycarbonates, polyimides, polyolefins, poly(vinylacetals), polyethers and polysulfonamides, opaque white polyesters and extrusion blends of polyethylene terephthalate and polypropylene. Acrylic resins, phenol resins, glass and metals may also be used as an ink-receiver. Other suitable ink-receiver materials can be found in Modern Approaches to Wettability: Theory and Applications. Edited by SCHRADER, Malcolm E., et al. New York: Plenum Press, 1992. ISBN 0306439859.

The ink-receiver may also incorporate mineral particles as fillers, such as e.g. PET containing $CaCO_3$, PET containing $TiO_2$, a-PET and PET-g.

Polyester film substrates and especially polyethylene terephthalate are preferred for certain applications particularly types with excellent dimensional stability. When such a polyester is used as the ink-receiver, a subbing layer may be employed to improve the bonding of the jetted ink layer to the substrate, if it constitutes together with the unsubbed substrate a substantially non-absorbing ink-receiver. Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

Stabilizers, leveling additives, matting agents, adjusting agents for physical film properties such as waxes, may also be added to the subbing layer as required.

Objects of the present invention can be realized by adapting the surface of the substantially non-absorbing ink-receiver with a surface treatment. This surface treatment increases the dispersive surface energy of the ink-receiver surface $\sigma_S^d$, such that the ratio $\sigma_S^d/\sigma_L^d$ of the dispersive surface energy of said ink-receiver surface $\sigma_S^d$ over the dispersive surface energy of said ink-jet ink $\sigma_L^d$ becomes greater than 0.9 and more preferably greater than 1.2.

A preferred surface treatment to increase the dispersive surface energy of the ink-receiver surface before ink ejection is a flame treatment, a corona treatment, a plasma treatment, or a liquid treatment. Of these, plasma treatment is extremely effective, since no ozone is generated.

Ink-Jet Ink

The ink-jet ink compositions for in the ink-jet printing system of the present invention include at least three main components: (i) monomers and/or oligomers, (ii) photoinitiator(s), and (iii) colorant (s), preferably at least one pigment. In addition, the inks may, optionally, contain one or more surfactants, dispersants, resins, inhibitors, hardeners, stabilizers and synergist additives.

Monomers and Oligomers

The ink-jet ink contains monomers and/or oligomers, which are polymerized by the curing means of the ink-jet printer. Monomers, oligomers or prepolymers may possess different degrees of functionality, and a mixture including combinations of mono-, di-, tri-and higher functionality monomers, oligomers or prepolymers may be used. These components are curable, typically photo-curable, e.g. UV curable, and should adhere to the ink-receiver surface after printing and serve to bind the colorant.

Adjusting the ratio between the monomers and oligomers is also a method of adjusting the viscosity of the ink. A higher functionality results in a higher viscosity.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Further, a hybrid system of combinations of these systems is also effective.

Cationic polymerization is superior in effectiveness due to lack of inhibition of polymerization by oxygen, however it is slow and its cost is high. If cationic polymerization is used, it is preferred to use an epoxy compound together with an oxetane compound to increase the rate of polymerization.

Radical polymerization is the most widely employed process. Preferred embodiments of radical polymerization will be described below.

Any polymerizable compound commonly known in the art may be employed. Particularly preferred for the ink-jet ink of the ink-jet printing system of the present invention are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4butanediol diacrylate, 1,6hexanediol diacrylate, 1,9nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, alkoxylated dimethyloltricyclodecane diacrylate and polytetramethylene glycol diacrylate, trimethylolpropane triacrylate, EO modified trimethylolpropane triacrylate, tri(propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Furthermoe, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and improved adhesion to an ink-receiver surface.

Furthermore, the ink-jet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Photo-Initiators

A catalyst called a photo-initiator typically initiates the polymerization reaction. The photo-initiator requires less energy to activate than the monomers and oligomers to form the polymer.

The photo-initiator absorbs light and is responsible for the production of free radicals or cations. Free radicals or cations are high-energy species that induce polymerization of monomers, oligomers and polymers and with polyfunctional monomers and oligomers thereby also inducing cross-linking.

A preferred amount of initiator is 1-10 weight % of the total ink weight, and more preferably 1-6 weight % of the total ink weight.

Irradiation with actinic radiation may be realized in two steps by changing wavelength or intensity. In such cases it is preferred to use 2 types of initiator together.

Photo-initiators are necessary for free radical curing and may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl)butan-1-one, benzil dimethylketal, bis (2,6-dimethylbenzoyl)-2,4,4-trimethylpentylphosphine oxide, 2,4,6trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluophosphate.

Suitable photo-initiators for the ink-jet ink of the ink-jet printing system according to the present invention include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocure™ 1173 and Darocure™ 4265 available from CIBA SPECIALTY CHEMICALS, Lucerin TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd. and isopropyl-thioxanthone.

Inhibitors

A polymerization inhibitor to restrain polymerization by heat or actinic radiation in ink may be added. It is preferred to add an inhibitor during preparation of the colorant dispersion.

Various compounds are known as polymerization inhibitors, and these compounds may be employed without modification. Examples of polymerization inhibitors include phenol type antioxidants, hindered amine light stabilizers, phosphor type antioxidants, hydroquinonemonomethyl ether commonly used in (metha)acrylate monomers, and hydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, Sumilizer™ GA-80, Sumilizer™ GM and Sumilizer™ GS produced by Sumitomo Chemical Co., Ltd.

Since excessive addition of these polymerization inhibitors will lower the ink sensitivity to curing, it is preferred that the amount capable of preventing polymerization be determined prior to blending. The amount of a polymerization inhibitor is generally between 200 and 20,000 ppm of the total ink weight.

Suitable combinations of compounds which decrease oxygen polymerization inhibition with radical polymerization inhibitors are: 2-benzyl-2-dimethylamino-1-(4-morpholinophenyl)-butane-1 and 1-hydroxy-cyclohexyl-phenyl-ketone; 1-hydroxy-cyclohexyl-phenyl-ketone and benzophenone; 2-methyl-1[4-(methylthio)phenyl]-2-morpholinopropane-1-on or 2-methyl-1[4-(methylthio)phenyl]-2-morpholinopropane-1-on and diethyltuioxanthone or isopropylthioxanthone; and benzophenone and acrylate derivatives having a tertiary amino group, and addition of tertiary amines. An amine compound is commonly employed to decrease an oxygen polymerization inhibition or to increase sensitivity. However, when an amine compound is used in combination with a high acid value compound, the storage stability at high temperature tends to be decreased. Therefore, specifically, the use of an amine compound with a high acid value compound in ink-jet printing should be avoided.

Synergist additives may be used to improve the curing quality and to diminish the influence of the oxygen inhibition. Such additives include, but are not limited to ACTILANE™ 800 and ACTILANE™ 725 available from AKZO NOBEL, Ebecryl™ P115 and Ebecryl™ 350 available from UCB CHEMICALS and CD 1012, Craynor CN 386 (amine modified acrylate) and Craynor CN 501 (amine modified ethoxylated trimethylolpropane triacrylate) available from CRAY VALLEY.

Colorants

In a preferred embodiment of the ink-jet printing system according to the present invention, the ink-jet ink further comprises at least one colorant. Colorants may be dyes, but are preferably pigments or a combination thereof. Both organic and/or inorganic pigments may be used.

Pigments suitable for the ink-jet ink of the ink-jet printing system according to the present invention include as red or magenta pigments: Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, and 88; as blue or cyan pigments: Pigment Blue 1, 15, 15:1, 15:2, 15:3, 15:4, 15:6, 16, 17-1, 22, 27, 28, 29, 36, and 60; as green pigments: Pigment green 7, 26, 36, and 50; as yellow pigments: Pigment Yellow 1, 3, 12, 13, 14, 17, 34, 35, 37, 55, 74, 81, 83, 93, 94, 95, 97, 108, 109, 110, 128, 137, 138, 139, 153, 154, 155, 157, 166, 167, 168, 177, 180, 185, and 193; as black pigments: Pigment Black 7, 28, and 26; as white pigment: Pigment White 6, 18, and 21.

A combination of a pigment or a dye with one or more other pigments and/or dyes may be used in the ink-jet inks for the ink-jet printing system according to the present invention.

While carbon black is usually used as the colouring material in black ink, it exhibits a high ultraviolet absorption, resulting in problems of rather low sensitivity in UV curing methods. Therefore, black ink using plural colour pigments other than titanium black or carbon black, may be used to produce black images exhibiting a good UV transparency. Thus, the black ink works quite effectively in ink-jet printing to improve interior hardening in shadow areas where a large amount of ink is specifically ejected in one spot with plural colours. Further, it also works effectively in bidirectional printing.

The particles of the pigment dispersed in the ink-jet ink should have a particle size of less than 10 μm, preferably less than 3 μm, and most preferably less than 1 μm. The average particle size of pigment particles is preferably 0.05 to 0.5 μm. By controlling the particle size, clogging of the print head nozzle can be prevented, and ink storage stability, ink transparency and ink curing sensitivity can be maintained.

Resins

The ink-jet ink used in the ink-jet printing system according to the present invention may further contain a resin in order to obtain a stable dispersion of the colorant in the ink-jet ink. Resins usable in this invention are not specifically restricted, but the following resins are preferred: petroleum type resins (e.g., styrene type, acryl type, polyester, polyurethane type, phenol type, butyral type, cellulose type, and rosin); and thermoplastic resins (e.g., vinyl chloride, vinylacetate type). Concrete examples of these resins include acrylate copolymers, styrene-acrylate copolymers, acetalized and incompletely saponified polyvinyl alcohol, and vinylacetate copolymers. Commercial resins are known under the tradenames Solsperse™ 32000 and Solsperse™ 39000 available from AVECIA, EFKA™ 4046 available from EFKA CHEMICALS BV, Disperbyk™ 168 available from BYK CHEMIE GMBH.

The resin content in the ink-jet ink is preferably controlled to give a viscosity of less than 100 mPa·s, preferably less than 50 mPa·s, and more preferably less than 30 mPa·s at a shear rate of 100 s$^{-1}$.

Dispersants and Surfactants

Objects of the ink-jet printing system, according to the present invention are preferably realized by selecting or adapting the curable ink-jet ink. Addition of a suitable surfactant or a compound with surface active properties can be used to decrease the dispersive surface energy of the ink-jet ink, $\sigma_L^d$, such that the ratio $\sigma_S^d/\sigma_L^d$ of the dispersive surface energy of said ink-receiver surface $\sigma_S^d$ over the dispersive surface energy of said ink-jet ink $\sigma_L^d$ becomes greater than 0.9 and more preferably greater than 1.2.

A fluorinated or silicone compound may be used as a surfactant, however, a potential drawback is bleed-out after image formation because the surfactant does not cross-link. It is therefore preferred to use a copolymerizable monomer having surface-active effects, for example, silicone-modified acrylates, silicone modified methacrylates, fluorinated acrylates, and fluorinated methacrylates. Specific examples are disclosed in WO 9929787 A (XAAR TECHNOLOGY LTD) and WO 9929788 A (XAAR TECHNOLOGY LTD ), herein incorporated by reference.

Suitable examples of surfactants for use in the ink-jet ink of the ink-jet printing system according to the present invention include, but are not limited to, ACTILANE™ 800 available from AKZO-NOBEL, Tego glide™ 410, Tego glide™ 435, Tego glide™ 440, Tego glide™ 450, Tego flow™ 300, Tego flow™ 425, Tego flow™ ZFS460, Tego rad™ 2100, Tego rad™ 2200-N, Tego rad™ 2600, Tego rad™ 2700, Tego disperse™ 610, Tego disperse™ 710, Tego wet™ ZFS453 and Tego wet™ 250 available from DEGUSSA, Dow Corning 67™ available from DOW CORNING, Surfadone™ 300 available from INTERNATIONAL SPECIALTY PRODUCTS, FC-430™, FC-171™ and FC-431™ available from 3M, BYK™ 306, BYK™ 333, BYK™ antiterra-u, Disperbyk™ 108 and BYK™ antiterra 204 available from BYK CHEMIE GMBH, and EFKA™ 47 and EFKA™ 400 available from EFKA CHEMICALS.

Organic Solvents

It can be advantageous to add an extremely small amount of an organic solvent to the ink-jet ink for use in the ink-jet printing system according to the present invention to improve adhesion to the ink-receiver surface after UV curing. In this case, the added solvent can be any amount in the range which does not cause problems of solvent resistance and VOC, and preferably 0.1-5.0%, and particularly preferably 0.1-3.0%.

Suitable organic solvents include alcohol, aromatic hydrocarbons, ketones, esters, aliphatic hydrocarbons, higher fatty acids, carbitols, cellosolves, higher fatty acid esters. Suitable alcohols include, methanol, ethanol, propanol and butanol. Suitable aromatic hydrocarbons include toluene, and xylene. Suitable ketones include methyl ethyl ketone and methyl isobutyl ketone.

Preparation of an Ink-Jet Ink

A dispersion of colorant for use in an ink-jet ink may be prepared by mixing, milling and dispersion of at least one colorant and at least one resin. Mixing apparatuses include a pressure kneader, an open kneader, a planetary mixer, a dissolver, and a Dalton Universal Mixer. Listed as apparatuses for milling and dispersion are a colloid mill, a high-speed disperser, double rollers, a bead mill, a paint conditioner, and triple rollers.

In the process of mixing, milling and dispersion, each process is performed with cooling to prevent build up of heat, and as much as possible under light conditions in which UV-light has been substantially excluded.

Preferably the viscosity of the ink-jet ink is lower than 100 mPa·s, more preferably lower than 50 mPa·s, and most preferably lower than 30 mPa·s at a shear rate of 100 s$^{-1}$.

INDUSTRIAL APPLICATION

The process according to the present invention can, for example, be used in more traditional ink-jet printing applications on flat surfaces such as polymeric supports for poster printing, but also in new emerging applications such as decorative printing (e.g. wallpaper, curtains and floorcovering), printing on unusual objects (e.g. ski's and mobile phone covers) and security printing applications (e.g. passports and identity cards).

The present invention will now be described in detail by way of Examples hereinafter. The percentages and ratios given in these examples are by weight unless otherwise indicated.

EXAMPLES

Measurement Methods

1. Surface Energy of the Liquid $\sigma_L$

The pendant drop technique was performed at 25° C. with a FTA4000 from First Ten Angstroms using a Gauge 19 or 20 stainless steel needle. The pixel dimensions at the magnification by a video-camera were calibrated using a by First Ten Angstroms certified standard of 1524.5 µm. After this absolute calibration, the calibration was verified using a measurement on water. The density of the ink, needed to perform the calculation, was determined by weighing 10 mL of ink on a Mettler AT200 to an accuracy of 0.001 g/cm$^3$. The surface energy $\sigma_L$ was obtained from the dimensions and the shape of the drop using the method of Bashford-Adams based upon the Young-Laplace shape of a drop influenced by gravity.

2. Surface Energy of the Liquid $\sigma_L^d$

All ink-jet inks used in the examples had a solubility larger than 0.1% of weight in hexane. The method of Owens-Wendt, as described above, was used to determine the contact angles with which the dispersive surface energy $\sigma_L^d$ of the liquid, i.e. the ink-jet ink, was calculated from one of the Fowkes equations (Equation 4 or 5) as described above. The dispersive surface energy $\sigma_S^d$ of PTFE was determined using the method of Owens-Wendt together with the Owens-Wendt equation to be 22.0 mJ/m$^2$.

3. Dispersive and Polar Surface Energy of the Solid

The Owens-Wendt equation was used to calculate the dispersive surface energy $\sigma_S^d$ and the polar surface energy $\sigma_S^p$ by linear regression based upon the reference liquids of Table 1. The surface energy $\sigma_S$ was obtained by adding together the calculated dispersive surface energy $\sigma_S^d$ and polar surface energy $\sigma_S^p$.

4. Measurement of Static Maximum Advancing and Minimum Receding Contact Angles

The static maximum advancing contact angle and the minimum receding contact angle were measured using an in-house built apparatus based upon the tilted plate method. A 30 µL droplet was deposited onto a horizontal PTFE surface. The PTFE surface was then slowly inclined up to a maximum tilt angle of 85 degrees. Gravity causes the drop to bulge more and more to one side as the inclination increases, thereby creating a larger contact angle, i.e. the static advancing contact angle, and a smaller contact angle, i.e. the static receding contact angle. This process is continuously monitored with a video camera recording 1 image for every 0.5 degree in tilt angle. At a certain angle of inclination the droplet ran off. The static maximum advancing and minimum receding angle were determined from the last image before the droplet ran off.

5. Optical Density

The optical density was measured using a MacBeth TR1224 densitometer with a visual filter.

6. Dot Size

The dot size was determined with a KDY set-up similar to the one available from ImageXpert but using Image-Pro image analysis software available from MEDIA CYBERNETICS. Dot size measurement was performed by measuring the diameter of a single dot, ignoring any satellites, a satellite being an overlapping dot produced by another ink-jet ink droplet or produced by a part of the same ink-jet ink droplet.

7. Spreading Factor

The spreading factor was used as a measure of the efficiency of filling-in an area of full-coverage by ink. The measurement involved the deposition of a droplet on an ink-receiver surface by means of an ink-jet print head with a certain droplet velocity, and determining the ratio of the diameter of the dot 1 second after impact divided by the diameter of the droplet before impact. A spreading factor of at least 2.0 represented a good spreading.

8. Viscosity

The viscosity of the ink-jet inks was measured with an AR1000-N rheometer from TA Instruments, using a plate and cone geometry (diameter 6 cm; cone angle 2°) at 25° C. and a shear rate of 100 s$^{-1}$.

9. Droplet Velocity

A stroboscopic technique based on print head triggering and power-LED illumination with the same frequency but a certain delay with regard to the print head triggering, was used to determine the droplet velocity. A CCD camera was used to take pictures, from which it is possible to determine the position of the drop at 2 different delays and to calculate its velocity, as exemplified by Equation 6.

$$\text{Drop velocity} = \frac{\text{Drop position (130 ns)} - \text{Drop position (80 ns)}}{50 \text{ ns}} \quad \text{(Equation 6)}$$

Materials

All materials used in the following examples were readily available from Aldrich Chemical Co. (Belgium) unless otherwise specified. The "water" used in the examples was demineralized water.

The following materials were used:

Substrates

PET is poly(ethylene) terephthalate. Unsubbed PET substrate with on the backside an antiblocking layer with antistatic properties available from AGFA-GEVAERT as P125C PLAIN/ABAS.

Teich 74, a hard aluminium foil coated with pigmented lacquer 581-74-700005 available from TEICH A. G., Austria.

Teich 75, a soft aluminium foil coated with pigmented lacquer 581-75-700005 available from TEICH A. G., Austria.

PE Telcon™, a co-extruded LMDPE/tie/EVOH/tie/LMDPE ink-receiver available from Telcon Packaging Ltd.

Fillers

Kieselsol™ 100F-30, a 30% dispersion of $SiO_2$ in water from BAYER.

Kieselsol™ 300, a 36% dispersion of $SiO_2$ in water from BAYER.

Sunsphere™ H51, an amorphous silica gel from DOKAI CHEMICAL INDUSTRIES.

Surface Active Agents

Mersolat™ H, a mixture of secondary alkane sulfonates from BAYER.

Mersolat™ H 76, a 76% aqueous paste of Mersolat H from BAYER.

Hostapon™ T powder, an anionic dispersant from CLARIANT

Hordamer™ PE O2, a dispersion of polyethylene and an anionic emulgator from CLARIANT.

Ultravon™ W triple concentration, a surfactant from CIBA-GEIGY.

Arkopan™ T paste 8015 from CLARIANT Benelux NV.

Arkopal™ N060, a nonylphenol ethoxylate type surfactant from CLARIANT.

Zonyl™ FSO100, a fluorosurfactant from DU PONT.

Polymers

Orgacon EL™, a 1.2 wt % aqueous dispersion of polyethylene dioxythiophene (a conductive polymer) from AGFA-GEVAERT.

Kelzan™ S, a xanthum gum from CP KELCO.

Example 1

In this example, different ink-receiver surfaces were prepared by coating a layer on a 100 μm thick PET substrate as described below.

Ink-Receiver Surface REC-1:

A coating solution was prepared by the mixing of 54.85 mL of a 42.75% latex based on a copolymer of vinylidene chloride-methylacrylate-itaconic acid-ethylacrylate (CAS 29757-50-4), 17.3 mL of Kieselsol™ 100F-30 and 7.2 mL of Mersolat™ H76-solution (3.69% in water) and 5.9 mL of a 5%-solution of Hostapon™ T in water. This coating solution was then applied by air knife coating to a uniaxially oriented PET (140 $m^2$/L), dried at 150° C. of air temperature and stretched in a transversal direction (factor 3.6) to provide the ink-receiver surface REC-1.

Ink-Receiver Surface REC-2:

A coating solution was prepared by the mixing of 246 mL of a 32% latex based on a copolymer of 88 wt % vinylidene chloride, 10 wt % methylacrylate and 2 wt % itaconic acid, 48 mL of Kieselsol™ 100F-30, 0.37 g of Mersolat™ H76 and 1.74 g of Ultravon™ ™ W triple concentration. This solution was then diluted with water to 1 liter. The diluted coating solution was then applied by air knife coating to a uniaxially oriented PET (130 $m^2$/l), dried at 150° C. air temperature and stretched in a transversal direction (factor 3.6) to provide the ink-receiver surface REC-2.

Ink-Receiver Surface REC-3:

A coating solution was prepared by the mixing of 23.6 mL of Orgacon EL™, 189 mL of a 30% latex based on a copolymer of 88 wt % vinylidene chloride, 10 wt % methylacrylate and 2 wt % itaconic acid, 9.5 g sorbitol and 48.3 g of Mersolat™ H76. This solution was then diluted with water to 1 liter. The diluted coating solution was then applied by air knife coating to a uniaxially oriented PET (130 $m^2$/L), dried at 150° C. air temperature and stretched in a transversal direction (factor 3.6) to provide the ink-receiver surface REC-3.

Ink-Receiver Surface REC-4:

A coating solution was prepared by the mixing of 5.7 g DGF STOESS gelatine dissolved in 961 mL water, 14.2 mL of Kieselsol™ 300, 0.1 g of Arkopan™ T paste 8015 and 0.2 g of Arkopal™ N060. The coating solution was then applied by cascade coating on the ink-receiver surface REC-2 (30 $m^2$/L) and dried at 150° C. to provide the ink-receiver surface REC-4.

Ink-Receiver Surface REC-5:

A non-linear polyester PPSMAD with an inherent viscosity of 0.25 dL/g (determined by testing procedure D2857 of ASTM) was synthesized by reacting 53 mol of dimethylphthalate, 40 mol of dimethylisophthalate, 5.6 mol of the sodium salt of dimethyl-(5)-isophthalate in a reaction chamber at 245° C. under a nitrogen atmosphere containing 200 mol of ethylene glycol, 0.04 mol of zincacetate as a catalyst and 0.01 mol of 1,3-benzenedicarboxylic acid 5,5'-[(1,4-dioxo-1,4-butanediyl)diimino]bis-tetramethyl ester as a branching agent. A coating solution was prepared by the mixing of 1.1 mL of Hordamer™ PE O2, 56.4 mL of a 25% dispersion of the copolymer PPSMAD, and water to form 1000 mL. The coating solution was then applied by air knife coating on a uniaxially oriented PET (100 $m^2$/L), dried at 150° C. air temperature and stretched in a transversal direction (factor 3.6) to provide the ink-receiver surface REC-5.

Ink-Receiver Surface REC-6:

A coating solution was prepared by dissolving 0.3 g of Kelzan™ S in 777 mL water, and then adding 30 g of Orgacon EL™ together with 0.6 g Kieselsol™ 100F, 132 mL of a 22% polymethylmethacrylate latex, 0.63 g of Zonyl™ FSO100 and 0.9 g of Sunsphere™ H51. The coating solution was then applied by cascade coating on the ink-receiver surface REC-2 (30 $m^2$/L) and dried at 150° C. to provide the ink-receiver surface REC-6.

The ink-receiver surfaces REC-1 to REC-6 were printed on a DOTRIX THE.FACTORY with the magenta ink of the AVECIA PRO-JET ULTRA T1A-CMYK ink-jet ink-set available from AVECIA (United Kingdom). The surface energy of the ink, together with the dispersive and the polar contribution, was determined. The surface energy $\sigma_L$ of the magenta ink was measured by the above-described pendant drop technique to be 31.2 mJ/m². The dispersive surface energy $\sigma_L^d$ was found using the above-described procedure using the Owens-Wendt method with a standard teflon plate and Fowkes Equation 5 (since $\sigma_L - \sigma_L^d > 0.2$ mJ/m²) to be 29.5 mJ/m², while the polar surface energy $\sigma_L^p$ was 1.7 mJ/m².

The printed samples were cured with a 248 W/cm UV mercury lamp from PRINT CONCEPT (Germany) in a nitrogen atmosphere with 7% residual $O_2$ at a power level of 2.6 W/cm² and a curing speed of 24 m/min.

TABLE 2

| Sample | Ink-receiver Surface | Dot size (µm) | Optical Density | Dispersive surface energy $\sigma_S^d$ (mJ/m²) | Ratio $\sigma_S^d/\sigma_L^d$ |
|---|---|---|---|---|---|
| INV-1 | REC-1 | 89 | 0.88 | 31.1 | 1.1 |
| COMP-1 | REC-2 | 35 | 0.57 | 27.5 | 0.9 |
| COMP-2 | REC-3 | 33 | 0.54 | 25.0 | 0.8 |
| COMP-3 | REC-4 | 34 | 0.60 | 26.5 | 0.9 |
| COMP-4 | REC-5 | 37 | 0.60 | 27.1 | 0.9 |
| COMP-5 | REC-6 | 30 | 0.48 | 25.2 | 0.9 |

The above results in Table 2 show that all of the comparative samples COMP-1 to COMP-5 have a dot size and an optical density much smaller than the inventive sample INV-1. In the case of the inventive sample INV-1, the ratio $\sigma_S^d/\sigma_L^d$ of the surface energy of the ink-receiver surface $\sigma_S^d$ over the dispersive surface energy of the ink $\sigma_L^d$ is greater than 0.9.

Example 2

In this example, 30 pL droplets of three different inks were jetted by means of a Spectra SL-128 print head with a droplet velocity of 2 m/s on four different ink-receiver surfaces.

The four different ink-receiver surfaces used, are:
REC-7=100 µm thick unsubbed PET
REC-8=REC-7 provided with a subbing layer described below
REC-9=Teich 74
REC-10=Teich 75

A coating solution was prepared by mixing of 696 mL of water, 246 mL of a 30% latex based on a copolymer of vinylidene dichloride-methylacrylate-itaconic acid, 48 mL of Kieselsol™ 100F-30 and 10 mL of a 4.85% solution of Mersolat™ H in water. The coating solution had a viscosity of 1.2 mPa·s at 25° C. The ink-receiver surface REC-8 was then prepared by coating this coating solution on REC-7 (140 m²/L), drying it at 150° C. air temperature and stretching it in transversal direction (factor 3.6).

The properties of the four ink-receiver surfaces are shown in Table 3. The sum of the dispersive surface energy $\sigma_S^d$ and the polar surface energy $\sigma_S^p$ is the surface energy $\sigma_S$ of the ink-receiver surface.

TABLE 3

| Ink-receiver Surface | $\sigma_S^p$ (mJ/m²) | $\sigma_S^d$ (mJ/m²) | $\sigma_S$ (mJ/m²) |
|---|---|---|---|
| REC-7 | 10.2 | 34.5 | 44.7 |
| REC-8 | 43.1 | 25.5 | 68.6 |

TABLE 3-continued

| Ink-receiver Surface | $\sigma_S^p$ (mJ/m²) | $\sigma_S^d$ (mJ/m²) | $\sigma_S$ (mJ/m²) |
|---|---|---|---|
| REC-9 | 4.4 | 29.4 | 33.8 |
| REC-10 | 2.9 | 32.8 | 35.7 |

The three different inks used, were:

INK-1=ink-jet ink U3397, a model type ink with a viscosity at 50° C. of 10-12 mPa·s and a surface energy $\sigma_L$ of 29.5 mJ/m², available from SUN CHEMICALS (United Kingdom) comprising propoxylated neopentyl glycol diacrylate as an UV-curable monomer, a fluorinated surfactant, copper phtalocyanine as a pigment and a phosphine oxide type photo-initiator.

INK-2=ink-jet ink U3398 a model type ink with a viscosity at 50° C. of 10-12 mPa·s and a surface energy $\sigma_L$ of 23.7 mJ/m² available from SUN CHEMICALS (United Kingdom) comprising propoxylated neopentyl glycol diacrylate as an UV-curable monomer, a silicone surfactant, copper phtalocyanine as a pigment and a phosphine oxide type photo-initiator.

INK-3=ink-jet ink U2968 a model type ink with a viscosity at 50° C. of 10-12 mPa·s and a surface energy $\sigma_L$ of 33.2 mJ/m² available from SUN CHEMICALS (United Kingdom) consisting of only the UV-curable monomer propoxylated neopentyl glycol diacrylate.

The properties of the 3 inks are shown in Table 4. The sum of the dispersive surface energy $\sigma_L^d$ and the polar surface energy $\sigma_L^p$ is the surface energy $\sigma_L$ of the ink.

TABLE 4

| Ink | $\sigma_L^p$ (mJ/m²) | $\sigma_L^d$ (mJ/m²) | $\sigma_L$ (mJ/m²) |
|---|---|---|---|
| INK-1 | 3.7 | 25.8 | 29.5 |
| INK-2 | 3.8 | 19.9 | 23.7 |
| INK-3 | 0.2 | 33.0 | 33.2 |

A droplet of 30 pL of the 3 different inks INK-1 to INK-3 was jetted on the 4 ink-receiver surfaces REC-1 to REC-4 by means of a Spectra SL-128 print head mounted in an ink-jet test printer with a droplet velocity of 2 m/s. The spreading factor was then determined. For an efficient fill-in of an area of full-coverage by ink, the spreading factor should at least be greater than 2.0. The results are shown in Table 5

TABLE 5

| Sample | Ink-receiver surface | Ink | Spreading Factor | Ratio $\sigma_S^d/\sigma_L^d$ |
|---|---|---|---|---|
| INV-2 | REC-7 | INK-1 | 3.5 | 1.3 |
| INV-3 | REC-8 | INK-1 | 2.1 | 1.0 |
| INV-4 | REC-9 | INK-1 | 2.6 | 1.1 |
| INV-5 | REC-10 | INK-1 | 3.5 | 1.3 |
| INV-6 | REC-17 | INK-2 | 5.0 | 1.7 |
| INV-7 | REC-8 | INK-2 | 2.4 | 1.3 |
| INV-8 | REC-9 | INK-2 | 2.6 | 1.5 |
| INV-9 | REC-10 | INK-2 | 5.0 | 1.6 |
| INV-10 | REC-7 | INK-3 | 3.1 | 1.0 |
| COMP-6 | REC-8 | INK-3 | 1.9 | 0.8 |
| COMP-7 | REC-9 | INK-3 | 1.8 | 0.9 |
| INV-11 | REC-10 | INK-3 | 3.1 | 1.0 |

The results in Table 5 show that all the comparative samples COMP-6 and COMP-7 exhibited a spreading factor smaller than 2.0. Inventive samples INV-2 to INV-11, all have a spreading factor greater than 2.0. The ratio $\sigma_S^d/\sigma_L^d$ of the surface energy of the ink-receiver surface $\sigma_S^d$ over the dispersive surface energy of the ink $\sigma_L^d$ is greater than 0.9 for all the invention examples INV-2 to INV-11, while the ratio $\sigma_S^d/\sigma_L^d$ for the comparative samples COMP-6 and COMP-7 is $\leq 0.9$.

Example 3

In this example the effect on the spreading factor of an UV-curable ink of a surface treatment on PE Telcon™ is investigated. The surface treatment consisted of a 300 J/m² corona treatment.

The properties of the treated and untreated ink-receiver surfaces are shown in Table 6. The sum of the dispersive surface energy $\sigma_S^d$ and the polar surface energy $\sigma_S^p$ is the surface energy $\sigma_S$.

TABLE 6

| Ink-receiver surface | Corona Treatment | $\sigma_S^p$ (mJ/m²) | $\sigma_S^d$ (mJ/m²) | $\sigma_S$ (mJ/m²) |
|---|---|---|---|---|
| REC-1 | No | 1.8 | 27.5 | 29.3 |
| REC-2 | Yes | 13.0 | 30.1 | 43.1 |

The coated samples were printed on a DOTRIX THE-.FACTORY with the magenta ink of Example 1, i.e. the magenta ink of the AVECIA PRO-JET ULTRA T1A-CMYK inkjet ink-set available from AVECIA (United Kingdom).

The printed samples were cured with a 248 W/cm UV mercury lamp available from PRINT CONCEPT (Germany) in a nitrogen atmosphere with 7% $O_2$ at a power level of 2.6 W/cm² and a curing speed of 24 m/min.

The spreading factor was then determined. For an efficient fill-in of an area of full-coverage by ink, the spreading factor should at least be greater than 2.0. The results are shown in Table 7.

TABLE 7

| Sample | Ink-receiver surface | Ratio $\sigma_S^d/\sigma_L^d$ | Spreading Factor |
|---|---|---|---|
| COMP-8 | REC-1 | 0.9 | 1.6 |
| INV-12 | REC-2 | 1.0 | 3.4 |

The above results in Table 7 show that the comparative sample COMP-8 has a spreading factor less than 2.0. The corona treatment adapts the ink-receiver surface, such that the ratio of the dispersive surface energy of said ink-receiver surface $\sigma_S^d$ over the dispersive surface energy of said ink-jet ink $\sigma_L^d$ becomes greater than 0.9 for the invention sample INV-12, a spreading factor of 3.4 being observed.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

We claim:

1. An ink-jet printing system comprising at least one ink-jet ink having a dispersive surface energy $\sigma_L^d$ and a means for jetting said ink-jet ink onto a surface of a substantially non-absorbing ink-jet ink-receiver having a dispersive surface energy $\sigma_S^d$, wherein the ratio $\sigma_S^d/\sigma_L^d$ is greater than 0.9.

2. An ink-jet printing system according to claim 1, wherein the ratio $\sigma_S^d/\sigma_L^d$ is greater than 1.2.

3. An inkjet printing system according to claim 1, wherein the dispersive surface energy of said ink-receiver surface $\sigma_S^d$ is at least 30.0 mJ/m².

4. An ink-jet printing system according to claim 1, wherein the dispersive surface energy of said ink-jet ink $\sigma_L^d$ is at most 30.0 mJ/m².

5. An ink-jet printing system according to claim 1, wherein the areal throughput of said ink-jet ink-receiver is at least 50 m² per hour at a resolution of at least 180 dpi.

6. An ink-jet printing system according to claim 1, wherein the printing is performed in a single pass.

7. An inkjet printing system according to claim 1, wherein said ink-jet ink is an UV-curable ink-jet ink.

8. An ink-jet printing system according to claim 1, wherein said ink-jet ink has a spreading factor greater than 2.0 when printed onto said surface of said substantially non-absorbing ink-jet ink-receiver.

9. A process for ink-jet printing comprising the steps of: (1) jetting at least one ink-jet ink having a dispersive surface energy $\sigma_L^d$ onto a surface of a substantially non-absorbing ink-jet ink-receiver receiver having a dispersive surface energy $\sigma_S^d$, and (2) curing said ink-jet ink, wherein the ratio $\sigma_S^d/\sigma_L^d$ is greater than 0.9.

10. A process for inkjet printing according to claim 9, wherein said ratio $\sigma_S^d/\sigma_L^d$ is greater than 1.2.

11. A process for ink-jet printing according to claim 9, wherein said dispersive surface energy of said substantially non-absorbing ink-jet ink-receiver surface $\sigma_S^d$ is at least 30.0 mJ/m².

12. A process for ink-jet printing according to claim 9, wherein said dispersive surface energy of said ink-jet ink $\sigma_L^d$ is at most 30.0 mJ/m².

13. A process for ink-jet printing according to claim 9, wherein the throughput of said ink-jet ink-receiver is at least 50 m² per hour at a resolution of at least 180 dpi.

14. A process for ink-jet printing according to claim 9, wherein the printing is performed in a single pass.

15. A process for ink-jet printing according to claim 9, wherein said ink-jet ink is an UV-curable ink-jet ink.

16. A process for ink-jet printing according to claim 9, wherein said ink-jet ink has a spreading factor greater than 2.0 when printed onto said surface of said substantially non-absorbing ink-jet ink-receiver.

17. An ink-jet printing system according to claim 1, wherein the dispersive surface energy of said ink-receiver surface $\sigma_S^d$ is at least 30.0 mJ/m², wherein the dispersive surface energy of said ink-jet ink $\sigma_L^d$ is at most 30.0 mJ/m², and wherein said ink-jet ink has a spreading factor greater than 2.0 when printed onto said surface of said substantially non-absorbing ink-jet ink-receiver.

18. An ink-jet printing system according to claim 17, wherein the ratio $\sigma_S^d/\sigma_L^d$ is greater than 1.2, and wherein the areal throughput of said ink-jet ink-receiver is at least 50 m² per hour at a resolution of at least 180 dpi.

19. A process for ink-jet printing according to claim 9, wherein the dispersive surface energy of said ink-receiver surface $\sigma_S^d$ is at least 30.0 mJ/m², wherein the dispersive surface energy of said ink-jet ink $\sigma_L^d$ is at most 30.0 mJ/m², and wherein said ink-jet ink has a spreading factor greater than 2.0 when printed onto said surface of said substantially non-absorbing ink-jet ink-receiver.

20. A process for ink-jet printing according to claim 19, wherein the ratio $\sigma_S^d/\sigma_L^d$ is greater than 1.2, and wherein the areal throughput of said ink-jet ink-receiver is at least 50 m² per hour at a resolution of at least 180 dpi.

* * * * *